MAGNETIC THIN-FILM DEVICE
Filed Nov. 10, 1966
FIG. 1
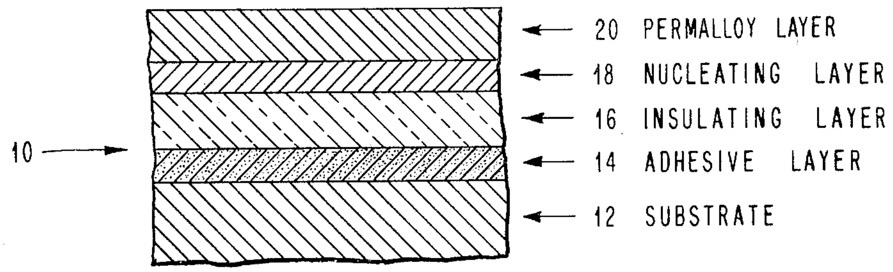
FIG. 4
| | | Ho | Hko | β | ∝ |
|---|---|---|---|---|---|
| | 1 | 3.6 | 4.3 | 2.0 | +0.2 |
| | 2 | 3.7 | 4.4 | 2.0 | +0.5 |
| a | 3 | 3.6 | 4.4 | 1.0 | +0.1 |
| | 4 | 3.6 | 4.3 | 2.0 | +0.9 |
| | 5 | 3.6 | 4.4 | 1.0 | +0.2 |
| | 1 | 4.7 | 4.8 | 4.0 | −0.2 |
| | 2 | 4.6 | 4.9 | 3.0 | 0.0 |
| b | 3 | 4.6 | 0.9 | 3.0 | 0.0 |
| | 4 | 4.7 | 5.0 | 4.0 | 0.0 |
| | 5 | 4.6 | 4.9 | 3.0 | 0.0 |
| | 1 | 6.2 | 4.5 | 6.0 | +1.5 |
| | 2 | 6.5 | 5.0 | 9.0 | +6.1 |
| c | 3 | 6.4 | 4.9 | 9.0 | +6.3 |
| | 4 | 6.1 | 4.5 | 7.0 | +1.5 |
| | 5 | 6.3 | 4.8 | 9.0 | +2.1 |
FIG. 2
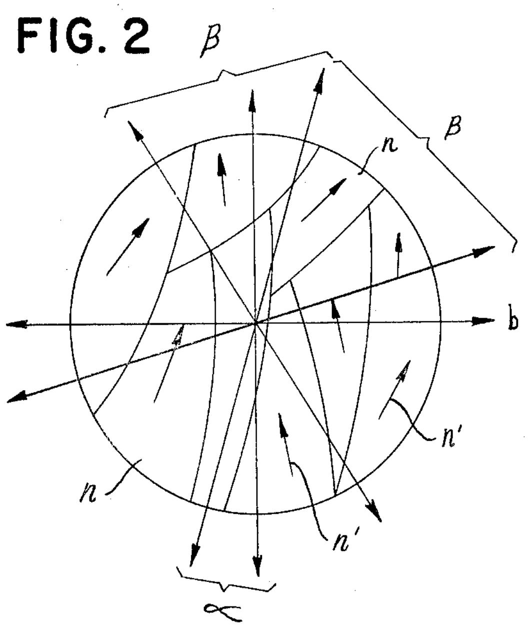
FIG. 3
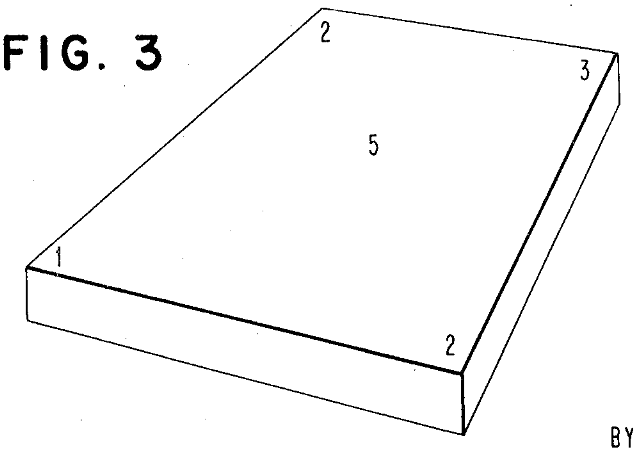
INVENTOR
DERRAL B. YORK
BY HANIFIN & CLARK 3,520,664
Patented July 14, 1970

3,520,664

MAGNETIC THIN-FILM DEVICE

Derral B. York, Essex Junction, Vt., assignor to International Business Machines Corporation, Armonk, N.Y., a corporation of New York Filed Nov. 10, 1966, Ser. No. 593,339
Int. Cl. H01f *10/06;* B44d *1/16*
U.S. Cl. 29—195 3 Claims

ABSTRACT OF THE DISCLOSURE

A magnetic thin-film device, and method of making, wherein the device has improved skew values. The device has an electrically discontinuous metal film between a substrate layer and a ferromagnetic material.

This invention is directed to an improved magnetic memory element. More particularly, this invention is directed to improved magnetic thin-film memory elements wherein a nucleating layer is interposed between an insulating layer and a thin-film magnetic layer to produce memory elements having uniform and predictable magnetic properties and to a process for producing the same.

A variety of magnetic thin-film devices, including memory elements, parametrons, delay lines and logic elements, have attracted the attention of both the scientific and industrial communities. Such devices offer both engineering and commercial advantages over present devices such as components in computer and data processing machines.

Based on estimated marketability and the anticipated problems of manufacture, by far the most promising of these devices is the simple bistable memory element first proposed by both M. S. Blois in the Journal of Applied Physics, vol. 26, 975 (1955) and by R. L. Conger, Physical Review, vol. 98, 1752 (1955). Such films are usually prepared from 80:20 by weight nickel-iron in the presence of a magnetic field that is applied to induce a uniaxial anisotropy in the film. With that anisotropy, an easy axis of magnetization is aligned parallel to the direction of the externally applied field, along which axis two stable states corresponding to positive and negative states are found.

The advantages of the magnetic thin-film holds promise of commercial realization in magnetic memory applications. In such a memory device, a network of drive lines is inductively coupled to each of the magnetic thin-film bit elements, a bit being used to designate a storage site. The network includes two sets of drive lines, with each of the members of each set being parallel to the other members of the same set. One of the sets is disposed parallel to the easy axis of the magnetic film and the second set is placed quadrature to the first set; both sets are inductively coupled to the film. The network takes the form of a lattice or matrix, containing longitudinal and lateral coordinates with the bits being located in those regions wherever a member from the second set of drive lines is transversed to a member of the first set. Rotation of the magnetization is brought about by activating selected numbers from the drive lines of both sets; interrogation of information is performed by activating selected drive lines of one set, to induce a field which is oriented to partially rotate the magnetization from the easy axis, which rotation is detected as a voltage response. With sensing equipment coupled to the film, reorientation of the magnetization from one stable state to the other in a thin-film is accomplished in noticeably short periods of time, in comparison to other storage devices, and is in the order of nanoseconds ($10^{-9}$).

But the resultant properties and degree of reliability recognized with a magnetic thin-film storage device are dictated to a great extent, if not entirely, by a number of considerations external to the film itself. A rather important factor in this regard is the substrate, the primary function being that of a mechanical support for the film, and, secondly, providing an electrical function. The substrate material and its crystallographic state (that is, whether it is amorphous, polycrystalline or a single crystal), the substrate surface topography, and profile, and the surface contaminations, are of particular significance and play a dominant role in determining the resultant magnetic device properties. While all the mechanisms and phenomena which take place on the substrate surface to influence the resulting magnetic properties of the thin-film are not fully understood, working hypothesis based on theoretical and experimental considerations has been advanced. What is found is that the surface roughness of the substrate on a microscopic scale, appears as a non-uniform distribution of hills and valleys which gives rise to local demagnetizing fields. Further, the substrate roughness affects the film growth by the subtle transfer of crystalline properties by the process of epitaxy. But since the substrate surface has a non-uniform profile, the crystallographic relationship between substrate and film is different from region to region, thereby bringing into play varying localized anisotropy forces. Normally greater substrate roughness results in higher coercive force, skew and dispersion, and greater scatter in values of these parameters over the magnetic film. High values and a large spread in magnitude of magnetic parameters over the surface of a film adversely affect power requirements, reliability, and cost resulting in an inoperable device or one that is not commercially competitive with other storage media.

Various approaches have been taken in attacking this problem. Initially, glass substrates were used since glass offers a smooth surface in comparison to other materials. An additional degree of smoothness, it was later discovered, is obtained by depositing silicon monoxide film over the glass surface, prior to disposing the magnetic thin-film thereon. Then, in search of greater compactness, emphasis was shifted to metal substrates, and use made of the substrate as return path for the drive lines, which offers gains over line impedance, current to field conversion and noise. But, in order to abate the effects of the metal substrate surface has on the magnetic properties, both elaborate polishing and silicon monoxide precoat are required. Now, while the silicon monoxide precoat substantially lessens the adverse effects the substrate surface has on the magnetic thin-film, the precoat now gives rise to several ancillary factors that prevent complete development of the desired properties on the film. These ancillary factors are an outgrowth, it appears, from a large thermal mismatch between the dielectric and the metal, the dependence of skew on the angle of incidence of deposition of the silicon monoxide, and the highly stressed state into which the silicon monoxide develops upon condensation. A further attempt to lessen the adverse affects has been the interposition of a metallic layer between the substrate and the silicon monoxide layer. The interposed metallic layer serves to increase the adhesive forces between the substrate and the silicon monoxide layer. It further acts as a smoothing layer, has an amorphous structure and provides a fresh clean surface thus eliminating some of the stresses generally formed in the insulating layer.

Another problem, not recognized in the prior art, leading to the nonuniformity of magnetic properties in magnetic thin-film memory devices lies within the magnetic thin-film itself. When the magnetic film is being evaporated agglomerations of the magnetic material are deposited on the insulating surface, and as a result large stresses are present in the deposited film. While no underlying theory is proposed as to why these stresses occur, it may be hypothecated that because of the high surface mobilities required for the agglomerations of deposited material to nucleate and thus form a continuous film, large energies and nucleating times are needed for crystallization thereof. For example, the deposited material will travel a given distance before it finds its lowest energy state, so that when the initial deposited agglomerations of material are without their area of mobility excess energy is required for nucleation and subsequent crystal growth. Further the agglomerations are randomly deposited over the surface of the insulating layer which results in the nonuniformity of thickness of the resultant film. What has been discovered here is that the deposition of a nucleating layer on the surface of the insulating layer produces nucleating centers around which a subsequent magnetic thin-film may grow. Thus, the layer of nucleating material serves to form small agglomerations, evenly dispersed over the surface of the insulating layer.

The thin magnetic film devices prepared by the prior art methods exhibited skew values of the order of ±3 degrees. However, such values are limited to the preparation of an array of devices measuring three by three inches. When attempts to prepare arrays greater than three by three inches by prior art methods, skew values of upwards to ±8 degrees are recorded. By the method of this invention an array of devices measuring nine by nine inchs may be prepared, which devices exhibit skew values of less than one degree without substantially affecting the values of coercive force and dispersion. The present invention also allows for increased useful deposition areas, increased bit plate yield and wider bit drive tolerances. Additionally, the invention provides improved easy access parallelism and as a result of lower skew values more uniform output signals over a bit plate are obtainable. Additionally, because of the reduced skew (i.e., fewer deviations of the easy axis from the direction of magnetization), the requirements for bit drive current and power requirements are reduced. Similarly, the invention has increased the probability of the use of unipolar sensing and/or driving modes at reduced memory cost.

Specifically, what is described herein is a plurality of bistable devices having a thin magnetic layer with reproducible and stable properties which are produced by providing a non-magnetic, electrically conductive, metallic substrate member. Deposited on the substrate is an electrically continuous coating of a second nonmagnetic material upon which there is superimposed an insulating material. Superimposed on the insulating material is a coating of a third nonmagnetic metallic material, which coating is electrically discontinuous. Subsequently a continuous coating of a ferromagnetic material is deposited on the precoated substrate. The ferromagnetic material being deposited in the presence of an orienting magnetic field.

Accordingly, it is an object of this invention to provide an improved structure for a magnetic thin-film memory element.

Yet another object of this invention is to provide improved magnetic thin-film memory elements having uniformity of magnetic properties over the surface thereof, exemplified by having low values of skew.

And still a further object of this invention is to provide improved magnetic thin-film memory devices in arrays greater than three by three inches while maintaining uniformity of magnetic properties over the surface thereof.

The foregoing and other objects, features and advantages of the invention will be apparent from the following more particular description of preferred embodiments of the invention, as illustrated in the accompanying drawings and examples.

FIG. 1 is a cross-sectional view of the layers of a magnetic thin-film memory device in accordance with the invention.

FIG. 2 is a schematic representation of the microscopic variance of the magnetization vector from the intended easy direction of magnetization to illustrate skew and dispersion.

FIG. 3 is a schematic six by six centimeter square film with the numerals thereon depicting the regions in which the magnetic properties of the magnetic thin-film memory device were measured to evaluate uniformity of properties and control of the magnetic parameters as given in FIG. 2.

FIGS. *4a* and *4b* represent the magnetic parameters of coercive force, and anisotropy field, dispersion and skew taken on a magnetic device which included a nucleating layer.

FIG. *4c* represents the magnetic parameters of coercive force, and anistropy field, dispersion and skew of a magnetic device with a magnetic thin-film was deposited over a layer of silicon monoxide absent the nucleating layer.

In accordance with one aspect of this invention there is provided the improved magnetic thin-film memory device as shown in FIG. 1. The device 10 includes a base portion 12 which may be a dielectric, such as glass or mica, but preferably is a conductive material, such as metal. Metal is preferred since it serves to carry current to produce the necessary driving fields for switching the magnetic layer; thereby attaining closer inductive coupling for the device.

The thickness of the substrate is not critical; it should, however, be such that it guarantees sufficient mechanical resistance for self-supporting. For example, metal sheets with a thickness of approximately 2.0 mm. are suitable. In order to fulfill the requirement of a good electrical conductor, it is useful to choose a metal or a metal alloy with a small specific resistance, i.e., below $5\times10^{-6}$ ohm cm. It is evident, that copper, gold, silver, aluminum or alloys thereof are suitable metals.

Over base 12 adhesive layer 14 is deposited which is formed from an oxide forming metal, where the metal oxide is of the type that is compatible with glass, such as chromium, tantalum, niobium or molybdenum; the particular metal used as that adhesive is not critical, provided it furnishes the necessary nuclei and bonding fields for the adhesion of the dielectric layer to the substrate.

In addition to its adhering properties, the metal layer 14, that is used has a recrystallization temperature that is above the deposition temperature of the succeeding layers, a low partial pressure of vaporization and exhibits chemical stability other than forming the superficial oxide layer heretofore mentioned. The layer 14 may be deposited in any of the conventional methods of deposition, such as electroplating, chemical reduction, vacuum deposition, cathode sputtering or the like.

Layer 14 is circumvented, in accordance with the present invention, if preferred, by a judicious choice of the substrate material. For example, where molybdenum is the substrate material, the dielectric layer that is subsequently deposited adheres directly to the substrate and dispenses with the requirement for an adhesive layer.

Superimposed over the adhesive layer 14 is the dielectric film 16. That film may be deposited by sputtering at high frequencies or by other conventional methods to a thickness of about $25\times10^3$ Angstroms. The particular apparatus for sputtering the dielectric at high frequency is the subject of co-pending patent application Ser. No. 428,733 of Davidse and Maissel, filed Jan. 28, 1965 now U.S. Pat. 3,369,991, and which patent application is assigned to the same assignee as the instant application. The details of the high frequency sputtering are not a part of this invention and will not be reviewed herein. The details of the high frequency sputtering and the apparatus provided therefor are adequately described in the aforementioned patent and in patent application Ser. No. 453,396 of Flur, Davidse and Maissel filed May 5, 1965 now U.S. Pat. 3,480,922, which patent application is assigned to the assignee of the instant application, and it is herein incorporated by reference.

Superimposed over the dielectric film 16 is the nucleating film 18. That film may be deposited by any conventional means to a thickness from about ten Angstroms to about 200 Angstroms, the major criterion is that it be electrically discontinuous. Nucleating layer 18 may be comprised of a metal selected from the group of Ag, Cr, Co, Ta, Fe , Au, Cu, Ni, V, and Ti. It should be kept in mind that the thickness of the nucleating film 18 is necessarily dictated by the choice of materials used. Each material having its own peculiar physical properties any may become continuous at different thicknesses.

Magnetic film 20 completes the device. The magnetic film 20 is comprised of a ferromagnetic material such as the permalloy type (55% to 85% Ni by weight with the balance Fe). Part of the nickel, up to about 10% by weight is replaceable with a metal such as molybdenum, cobalt, palladium or the like. The thickness of the layer is usually between 700 to 1,000 Angstroms but may vary in accordance with the properties desired and the materials used.

According to another aspect of this invention there is provided a method of fabrication the above described magnetic thin-film memory device. In order that those skilled in the art may better understand how the present aspect of the invention may be practiced, reference is made to FIG. 1 and to the following examples. The examples given are preferred embodiments of the invention and are given by way of example only and not by way of limitation.

EXAMPLE I

A rolled silver-copper alloy plate containing 80 weight percent silver and 20 weight percent was fashioned into the substrate. The initial steps in preparing the substrate entailed machine rolling the plate to the desired substrate size. The substrate was then heat treated in a forming gas to reduce the internal stresses that were introduced during the machining operation. The substrate was then rough lapped in a planetary lapper using 0.4 micron Alundum, abrasives, to reduce the plate thickness to the desired dimensions of about 0.080 inch. The substrate was subsequently fine lapped on a second planetary lapper using 0.3 micron Alundum.

A 6 x 6 inches array of the prepared substrates were placed in a vacuum apparatus, of the type described in the aforementioned patent application Ser. No. 453,396. A chromium film was vacuum deposited, with the vacuum chamber being maintained at a pressure of $10^{-5}$ torr. During the deposition of the chromium, the substrates were maintained at a temperature between 300° to 450° and the chromium deposited at the rate of about 10 to 15 Angstroms per second with the chromium growing to a thickness between 400 to 1,000 Angstroms. Thereafter, silicon monoxide was vacuum deposited over the chromium, the pressure in the chamber was between $10^{-5}$ to $10^{-7}$ torr while the substrates' temperatures were about 400° C. The silicon monoxide was condensed onto the heated substrates at the rate of about 300 to 350 Angstroms per second and grown to a thickness between 1 to 4 microns.

Following the deposition of the silicon monoxide a thin electrically discontinuous layer of silver was evaporated thereon, the pressure in the chamber was about $10^{-5}$ torr. A film of about 15 Angstroms was deposited, as determined by the change in frequency of an oscillating crystal plate placed near the substrate's surface.

The array of devices is then completed with the vacuum deposited of a nickel-iron-cobalt alloy which consisted of about 78 to 79 percent by weight nickel, 18 to 19 percent by weight iron, with the balance being cobalt. The nickel-iron-cobalt was deposited in a vacuum at a pressure of about $3 \times 10^{-6}$ torr with the substrate, during this deposition, being maintained at a temperature of about 400° C. A uniform magnetic field of about 40 oersteds was induced by magnetic coils located outside the vacuum chamber to induce the desired anisotropy. The magnetic thin-film was deposited at the rate of about 20 Angstroms per second to a thickness between 700 to 1,000 Angstroms.

The magnetic properties were measured by the Kerr method. The averaging values obtained are given in Table 1 below.

EXAMPLE II

The array of devices of Example II were prepared in the same manner as the devices of Example I except a thin layer of chromium was evaporated onto the SiO surface to form the nucleating layer. The average values found for the magnetic properties are shown in Table 1 (see below).

EXAMPLE III

The array of devices of Example III were prepared in the same manner except that the magnetic film was deposited directly onto the SiO surface without an intermediate nucleating film. The average values found for the resulting magnetic properties are given in Table 1.

That the magnetic thin-film memory devices prepared in accordance with the present invention offers a unique combination of magnetic properties with a high degree of uniformity of control, heretofore not available, is brought out by the data in FIG. 4 and that in Table 1 that hereafter follows.

TABLE 1

| | $H_o$ | $H_{ko}$ | $\beta$ | $\Delta\alpha$ |
|---|---|---|---|---|
| Ag nucleation | 3.6 | 4.9 | 1.5 | 0.9° |
| Cr nucleation | 4.7 | 4.6 | 3.0 | 1.8° |
| No nucleation | 5.8 | 4.9 | 8.0 | 3.7° |

It will be noted that the data presents the magnetic parameters of cohesive force $H_o$, anisotropy field, $H_{ko}$, dispersion $\beta$ and skew $\alpha$ which are of particular significance in the evaluation of a magnetic thin-film memory element. These terms are well known in the art and widely described in the literature. For example, see H. J. Kump, "The Anisotropy Fields in Angular Dispersion of Permalloy Films" 1963 proceedings of the International Conference on Non-linear Magnetics, Article 1205. But to facilitate the discussion on hand, the terminology is briefly reviewed. $H_o$ cohesive force is a measure of the easy direction field necessary to start a domain wall in motion, a threshold for wall motion switching. $H_{ko}$ . . . Anisotropy field may be thought of as the force required to rotate the magnetization from its preferred direction of magnetization to the hard direction of magnetization and, $H_{ko}$ is the anisotropy field as viewed on a microscopic scale. $\beta$ . . . Dispersion is conveniently defined with reference to FIG. 2 which shows a section of a magnetic thin-film as comprising an aggregate of microscopic magnetic regions *n*. Associated with each of the microscopic magnetic regions *n* is a magnetization vector *n'*. Under ideal conditions, each of the magnetization vectors *n'*, related to a microscopic magnetic region *n*, is parallel one to the other with the vector summation thereof yielding their intended easy direction of magnetization depicted as arrow 300. But, owing to various imperfections and fabrication difficulties, some of which are hereafter discussed, the intended easy direction of magnetization, alloy 300, is not achieved. The mathematical means of the magnetization vectors *n'* gives rise to a new easy direction of magnetization designated arrow 302, and the angle $\beta$, between the intended easy direction, arrow 300 and the mean easy direction, arrow 302 is skew, which is more fully discussed below, the angle in which we find 90% of the microscopic magnetization *n'* of the microscopic magnetic regions *n* is dispersion, and that angle $\beta$ is graphically illustrated in FIG. 3 as the angle between the mean easy axis, arrow 302, and the boundary line, arrow 304, which includes 90% of the deviations of the magnetization vector $n'$ from the intended easy axis of magnetization arrow 300. Measurement of dispersion is similar to that discussed in the article by T. S. Crowther, entitled "Techniques for Measuring the Angular Dispersion of the Easy Axis of Magnetic Film." Group report #51–2, MIT, Lincoln Lab, Lexington, Mass. (1959). $\alpha$ . . . Skew is defined with reference to FIG. 2. It comes about as a result of the average of the local dispersions of the easy direction, and the individual magnetic regions. The summation of these local dispersions yields an externally discernible average easy direction for the entire film which is designated $\alpha$, the angle between the actual easy axis 302 and the intended easy axis 300. Skew may be thought of as the macroscopic deviation of easy direction of magnetization from the desired reference while dispersion is the microscopic deviation. Various causes have been given for the direct variation from the intended easy axis: Inhomogenities of the magnetic field used to impart the desired anisotropy, magnetostrictive effects, stresses and strains developed during the deposition, substrate scratches, and temperature radiance. With the present invention, low values of skew, $\alpha$, and dispersion, $\beta$ are obtained.

Quasi-static magnetic measurements of the wall motion threshold $H_o$, anisotropy field $H_{ko}$, dispersion of the easy axis and skew were made with a 60 cycle Kerr-effect loop tracer having a light-spot dimension of less than 2 microns in diameter. Measurements were taken at the center and four edges of each specimen as brought out by FIG. 4 of the drawings.

FIG. 4 of the drawings presents a ready comparison of the magnetic properties obtained with a nucleating film intermediate the magnetic film and the insulating layer, to that obtained with a magnetic storage device made in the conventional manner. FIGS. *4a* and *4b* refer to the magnetic thin-film memory devices in accordance with the invention, while FIG. *4c* refers to the memory devices made by coventional means. The above shows the magnetic memory element with the nucleating layer is characterized by lower cohesive force, $H_o$, anisotropy field $H_{ko}$, dispersion $\beta$ and skew $\alpha$. The degree of uniformity now available for all properties with the nucleating film and, in particular with dispersion and skew, enhances reliability and lower power requirements. Device uniformity and therefore its performance is generally superior to that previously known or expected in the art.

Improvement and uniformity, control and predictability over device performance is better appreciated with a comparison of the magnetic characteristics of a storage device in accordance with the present invention, of that of a device, which was formed by depositing permalloy directly on to a silicon monoxide substrate which is presented in Table 1, supra. The important part played by the nucleating film in improving the overall device performance of the magnetic storage device is indicated. Even more importantly, however, is the great improvement effected by the nucleating film stabilizing the magnetic parameters over the surface of the memory element which is prior devices is a major source of reproducibility problems.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A magnetic thin-film memory device having improved and uniform magnetic properties comprising a non-magnetic metallic substrate member, an insulating layer superimposed over said substrate member and adhering thereto, a ferromagnetic thin-film having a skew value of less than one degree disposed on said insulating layer, and a nucleating layer comprising an electrically discontinuous metal film interposed between said insulating layer and said ferromagnetic thin-film, said nucleating layer causing said ferromagnetic film to exhibit improved easy axis parallelism.

2. The magnetic thin-film device of claim 1, wherein the nucleating layer comprises a thin electrically discontinuous metallic film selected from a group of metals consisting of Cr, Ag, Co, Au, Fe, Ni, Cu, V, Ti and Mn.

3. The element of claim 2 wherein a first metallic film is superimposed over said metallic substrate member, said first metallic film adhering to said substrate member and furnishing adhesive bonds for subsequent layers to be deposited.

References Cited

UNITED STATES PATENTS

| | | | |
|---|---|---|---|
| 3,055,770 | 9/1962 | Sankuer et al. | |
| 3,150,939 | 9/1964 | Wenner. | |
| 3,239,374 | 3/1966 | Ames et al. ------- | 117—217 X |
| 3,303,116 | 2/1967 | Naissel et al. | |

WILLIAM D. MARTIN, Primary Examiner

B. D. PIANALTO, Assistant Examiner

U.S. Cl. X.R.

117—217, 238, 239, 240